United States Patent
Pabalan et al.

(10) Patent No.: US 10,633,579 B2
(45) Date of Patent: Apr. 28, 2020

(54) USE OF ENVIRONMENTALLY FRIENDLY SOLVENTS TO REPLACE GLYCOL-BASED SOLVENTS

(75) Inventors: Ruela Talingting Pabalan, Burlington, NJ (US); Dominique Labarre, Neuilly Sur Seine (FR); Gary Woodward, Northwich (GB); Bruno Langlois, Paris (FR); Adedamola Adedeji, Carteret, NJ (US)

(73) Assignee: RHODIA OPERATIONS, Paris (FR)

( * ) Notice: Subject to any disclaimer, the term of this patent is extended or adjusted under 35 U.S.C. 154(b) by 116 days.

(21) Appl. No.: 13/564,300

(22) Filed: Aug. 1, 2012

(65) Prior Publication Data

US 2013/0196885 A1   Aug. 1, 2013

Related U.S. Application Data

(60) Provisional application No. 61/574,360, filed on Aug. 1, 2011.

(51) Int. Cl.
*C09K 8/68* (2006.01)
*C09K 8/86* (2006.01)
*C09K 8/035* (2006.01)

(52) U.S. Cl.
CPC ............. *C09K 8/86* (2013.01); *C09K 8/035* (2013.01); *C09K 8/68* (2013.01); *C09K 2208/00* (2013.01)

(58) Field of Classification Search
CPC . C09K 8/035; C09K 8/68; C09K 8/32; C09K 8/64; C09K 2208/00; C09K 2208/12; C09K 8/06; C09K 8/26; C09K 8/28; C09K 8/34; C09K 8/5045; C09K 8/506; C09K 8/52; C09K 8/60; C09K 8/602; C09K 8/607; C09K 8/882; C09K 8/885; C09K 8/90; C09K 8/12; C09K 8/20; C09K 8/206; C09K 8/24; C09K 8/905; E21B 43/25; E21B 33/138; E21B 43/16; E21B 43/26
See application file for complete search history.

(56) References Cited

U.S. PATENT DOCUMENTS

| | | | | |
|---|---|---|---|---|
| 5,330,788 A | * | 7/1994 | Roberts .................. | C09D 5/008 134/38 |
| 5,902,587 A | * | 5/1999 | Carle et al. .......... | C07D 493/10 203/95 |
| 5,919,372 A | | 7/1999 | Galante et al. | |
| 6,176,243 B1 | | 1/2001 | Blunk | |
| 8,222,194 B2 | * | 7/2012 | Trivedi .............. | C08G 65/3314 510/174 |
| 8,821,648 B2 | * | 9/2014 | Lourenco ............. | C11D 3/2075 134/25.2 |
| 2002/0147114 A1 | | 10/2002 | Dobson, Sr. et al. | |
| 2002/0193257 A1 | | 12/2002 | Lee et al. | |
| 2003/0228997 A1 | * | 12/2003 | Doyel .................... | C11D 7/509 510/410 |
| 2007/0281869 A1 | | 12/2007 | Drochon et al. | |
| 2008/0139437 A1 | * | 6/2008 | Power .................... | C09D 9/005 510/208 |
| 2009/0149557 A1 | | 6/2009 | Talingting-Pabalan et al. | |
| 2009/0281012 A1 | * | 11/2009 | Trivedi .............. | C08G 65/3314 510/138 |
| 2010/0137480 A1 | * | 6/2010 | Denilson ............ | C08G 18/2815 524/108 |
| 2012/0040880 A1 | * | 2/2012 | Rieth ....................... | A61K 8/39 510/138 |
| 2012/0046212 A1 | * | 2/2012 | Bourdette ................ | C09D 9/04 510/206 |
| 2013/0146545 A1 | * | 6/2013 | Pabalan ............... | C11D 1/8255 210/698 |
| 2014/0031271 A1 | * | 1/2014 | Lourenco ............. | C11D 3/2075 510/238 |

FOREIGN PATENT DOCUMENTS

| | | | |
|---|---|---|---|
| EP | 1331357 A1 | | 7/2003 |
| JP | S5198729 | * | 8/1976 |
| JP | H0673318 | * | 3/1994 |
| KR | 1020040070114 A | | 8/2004 |
| WO | 9712947 | | 4/1997 |
| WO | 2006078723 A2 | | 7/2006 |
| WO | WO2010/084159 | * | 7/2010 |
| WO | 2011005672 A2 | | 1/2011 |
| WO | WO2011/086421 | * | 7/2011 |

OTHER PUBLICATIONS

"Hazard warning on home cleaners", Jane Kay (Jul. 24, 2007).
"Potential Hazards of Home Cleaning Products", Alexandra Gorman, Jul. 2007.
"Toxicology and Carcinogenesis Studies 2-Butoxyethanol (CAS No. 111-76-2) in F344/N Rats and B6C3F1 Mice (Inhalation Studies)", National Toxicology Program: Department of Health and Human Services, Jun. 4, 2010.

(Continued)

*Primary Examiner* — Kumar R Bhushan

(57) ABSTRACT

A method for replacing glycol-based mutual solvents in an oil field application comprising: obtaining an alternative solvent and solvent blends and replacing all or a portion a glycol-based mutual solvent, which forms a component of an oil field formulation, with the alternative solvent or solvent blends, wherein the oil field formulation can be utilized in an oil field application.

4 Claims, 1 Drawing Sheet

(56) References Cited

OTHER PUBLICATIONS

Randall C. Baselt, Disposition of Toxic Drugs and Chemicals in Man, 8th edition, Biomedical Publications, Foster City, CA 2008, pp. 208-210.
"Glycol Ethers Fact Sheet", California Hazard Evaluation and Information Service, Jun. 1989.
"California Code of Regulations, Title 8, Section 339. The Hazardous Substances List", State of California Department of Labor Relations, Apr. 21, 2008.
"List of Hazardous Air Pollutants, Petition Process, Lesser Quantity Designations, Source Category List; Petition to Delist of Ethylene Glycol Monobutyl Ether", U.S. Environmental Protection Agency, Nov. 29, 2004.
"Current Use Patterns in Canada, Toxicology Profiles of Alternatives, and the Feasibility of Performing an Exposure Assessment Survey", Environment Canada, May 23, 2003.
Agency for Toxic Substances and Disease Registry ToxFAQs, Aug. 1999.

* cited by examiner

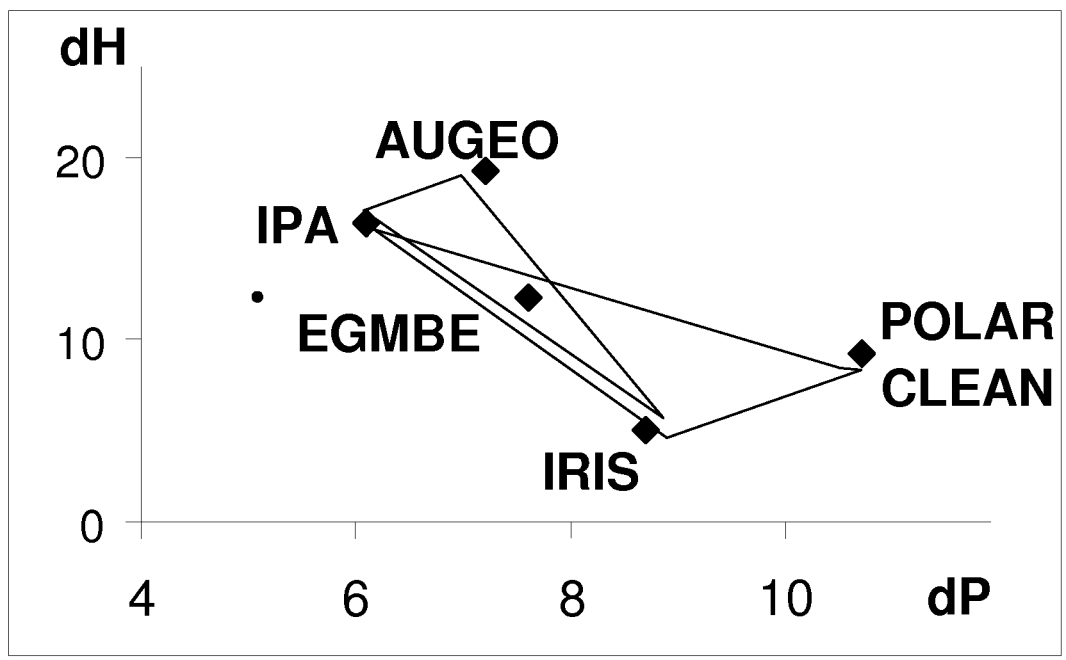

USE OF ENVIRONMENTALLY FRIENDLY SOLVENTS TO REPLACE GLYCOL-BASED SOLVENTS

CROSS-REFERENCE TO RELATED APPLICATIONS

The application claims the benefit of U.S. Provisional Application Ser. No. 61/574,360 filed Aug. 1, 2011, herein incorporated by reference.

FIELD OF THE INVENTION

This invention relates to compounds, methods and systems of mutual solvents that are more biodegradable, as well as less toxic and/or safer to use than glycol-based mutual solvents, specifically ethyleneglycolmonobutyl ether (EGMBE), utilized in industrial and oil field applications.

BACKGROUND OF THE INVENTION

Mutual solvents are typically additives used in oil field and well applications that are soluble in oil, water and acid-based treatment fluids. A commonly used mutual solvent is ethyleneglycolmonobutyl ether, generally known as EGMBE. EGMBE is routinely used in a range of applications, such as removing heavy hydrocarbon deposits, controlling the wettability of contact surfaces before, during or after a treatment, and preventing or breaking emulsions.

Some solvents have been used in place of EGMBE; however, many such solvents suffer the same drawbacks as EGMBE, such as being environmentally unfriendly or similarly toxic and hazardous. These include glycol ethers like Dowanol™ pnB (propylene glycol n-butyl ether), or butyl carbitol (diethylene glycol butyl ether), ethylene glycol monoacetate, butyl carbitol, triethylene glycol monoethyl ether, 1,1'-oxybis(2-propanol), triethylene glycol monomethyl ether, triglyme and diglyme, among others. Some of these solvents are reported as "priority pollutants".

Recent findings have shown that EGMBE as well as glycol ether-based solvents are potentially hazardous and/or toxic, and are potent teratogens to humans. There is a need for a replacement mutual solvent that does not face the drawbacks and problems associated with currently utilized solvents such as EGMBE.

SUMMARY OF THE INVENTION

The present invention described herein will become apparent from the following detailed description and examples, which comprises in one aspect, an alternative solvent blend comprising mutual solvents.

There is a need, and in particular a need in the oil field industry, for compounds that are good solvents that have a favorable toxicological and/or ecological profile, and desirable characteristics in terms of low volatility, biodegradability or ready biodegradability (i.e., readily biodegradable), low toxicity and/or low hazard level.

In one aspect, described herein is a method for replacing glycol-based mutual solvents in an oil field application comprising: —obtaining an alternative solvent blend; and —replacing all or a portion a glycol-based mutual solvent, which forms a component of an oil field formulation, with the alternative solvent, wherein the oil field formulation can be utilized in an oil field application.

In one embodiment, the method further comprises the step of utilizing such alternative solvent blend in the oilfield application. In another embodiment, the glycol-based mutual solvent is selected from glycol ethers, alkyl ethers of ethylene glycol, alkyl ethers of propylene glycol, ethylene glycol, EGMBE (ethylene glycol mono-butyl ether), propylene glycol n-butyl ether, diethylene glycol butyl ether, ethylene glycol monoacetate, butyl carbitol, triethylene glycol monoethyl ether, 1,1'-oxybis(2-propanol), triethylene glycol monomethyl ether, triglyme or diglyme. The oil field application, in one embodiment, is a well treatment fluid, a fracturing fluid, a stimulation fluid, a workover fluid or a slickwater fluid In one embodiment, the alternative solvent blend comprises at least one component selected from one or more of the following:

a) dialkyl methylglutarate;

b) a first blend of: dialkyl methylglutarate, dialkyl ethylsuccinate and, optionally, dialkyl adipate;

c) a second blend of: dialkyl adipate, dialkyl glutarate and dialkyl succinate;

d) a dioxolane compound of formula I:

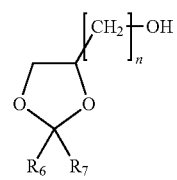

wherein $R_6$ and $R_7$, which may be identical or different, is individually a hydrogen, an alkyl group, an alkenyl group, a phenyl group, wherein n is an integer of from 1 to 10;

e) a compound or mixture of compounds having formula (II):

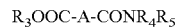

$$R_3OOC\text{-}A\text{-}CONR_4R_5 \qquad (II),$$

wherein $R_3$ is a group chosen from saturated or unsaturated, linear or branched, optionally cyclic, optionally aromatic hydrocarbon-based groups comprising an average number of carbon atoms ranging from 1 to 36; wherein $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36. $R_4$ and $R_5$ in some embodiments together form a ring, which in some embodiments are substituted or comprises a heteroatom. A is a linear or branched divalent alkyl group comprising an average number of carbon atoms ranging from 2 to 12, typically from 2 to 4;

f) an alkyldimethylamine (e.g., N,N-Dimethyldodecylamine);

g) a $C_1$-$C_4$ alcohol (e.g., isopropyl alcohol); and h) any combination thereof.

In some embodiments, the alkyldimethylamine is N,N-Dimethyldodecylamine. In other embodiments, the $C_1$-$C_4$ alcohol is isopropyl alcohol.

In some particular embodiments, the alternative solvent blend comprises:

a) a first blend comprising dialkyl methylglutarate and dialkyl ethylsuccinate;

b) a dioxolane compound of formula I:

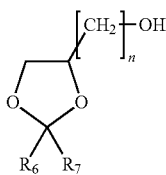

wherein $R_6$ and $R_7$, which may be identical or different, is each individually a hydrogen, an alkyl group, an alkenyl group, a phenyl group, wherein n is an integer of from 1 to 10; and e) a compound or mixture of compounds having formula (II):

wherein $R_3$ is a group chosen from saturated or unsaturated, linear or branched, optionally cyclic, optionally aromatic hydrocarbon-based groups comprising an average number of carbon atoms ranging from 1 to 36; wherein $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36; wherein A is a linear or branched divalent alkyl group comprising an average number of carbon atoms ranging from 2 to 12.

In an alternative aspect, described herein are alternative solvent blend compositions for use in oilfield applications, the alternative solvent blend composition selected from the group consisting of:

a) dialkyl methylglutarate;
b) a first blend of: dialkyl methylglutarate, dialkyl ethylsuccinate and dialkyl adipate;
c) a second blend of dialkyl adipate, dialkyl glutarate and dialkyl succinate;
d) a dioxolane compound of formula I:

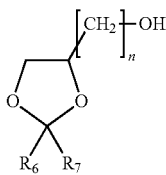

wherein R6 and R7, which may be identical or different, is individually a hydrogen, an alkyl group, an alkenyl group, a phenyl group, wherein n is an integer of from 1 to 10;

e) a compound or mixture of compounds having formula (II):

wherein $R_3$ is a group chosen from saturated or unsaturated, linear or branched, optionally cyclic, optionally aromatic hydrocarbon-based groups comprising an average number of carbon atoms ranging from 1 to 36;

wherein $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36; and wherein A is a linear or branched divalent alkyl group comprising an average number of carbon atoms ranging from 2 to 12;

f) an alkyldimethylamine;
g) a $C_1$-$C_4$ alcohol; and
h) any combination thereof, wherein the alternative solvent blend is used in place of all or a portion a glycol-based mutual solvent which forms a component of an oil field formulation utilized in an oil field application.

In yet another aspect, described herein are methods for replacing glycol-based mutual solvents in an oil field application comprising:

obtaining an alternative solvent;
utilizing the alternative solvent in place of all or a portion a glycol-based mutual solvent, which forms a component of an oil field formulation utilized in an oil field application.

The alternative solvent, in some embodiments, can be selected from the group consisting of:

a) dialkyl methylglutarate;
b) a first blend of: dialkyl methylglutarate, dialkyl ethylsuccinate and dialkyl adipate;
c) a second blend of dialkyl adipate, dialkyl glutarate and dialkyl succinate;
d) a dioxolane compound of formula I:

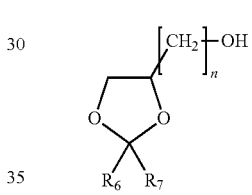

wherein $R_6$ and $R_7$, which may be identical or different, is individually a hydrogen, an alkyl group, an alkenyl group, a phenyl group, wherein n is an integer of from 1 to 10;

e) a compound or mixture of compounds having formula (II):

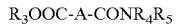

wherein $R_3$ is a group chosen from saturated or unsaturated, linear or branched, optionally cyclic, optionally aromatic hydrocarbon-based groups comprising an average number of carbon atoms ranging from 1 to 36;

wherein $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36; and wherein A is a linear or branched divalent alkyl group comprising an average number of carbon atoms ranging from 2 to 12; and f) an alkyldimethylamine;
g) a $C_1$-$C_4$ alcohol; and
h) any combination thereof.

In one embodiment, the "replacement mutual solvent blend" described herein has desirable qualities including one or a combination of being: substantially non-toxic, non-flammable, biodegradable, high flash point, low vapor pressure and low odor; meets the consumer products LVP-VOC exemption criteria established by CARB and the EPA (certain sections) relative to mutual solvents currently used in oilfield applications, such as EGMBE or other glycol ethers.

BRIEF DESCRIPTION OF DRAWINGS

FIG. 1 is a Hansen Parameter map showing EGMBE and other glycols compared with alternative solvents, as described herein.

DETAILED DESCRIPTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "$(C_r\text{-}C_s)$" in reference to an organic group, wherein r and s are each integers, indicates that the group may contain from r carbon atoms to s carbon atoms per group.

As used herein, the terminology "surfactant" means a compound that when dissolved in an aqueous medium lowers the surface tension of the aqueous medium.

As used herein, the terminology glycol-based mutual solvents means glycol ethers or derivatives thereof, alkyl ethers of ethylene glycol, alkyl ethers of propylene glycol, ethylene glycol. Examples of glycol-based mutual solvents include EGMBE (ethylene glycol mono-butyl ether), propylene glycol n-butyl ether, diethylene glycol butyl ether, ethylene glycol monoacetate, butyl carbitol, triethylene glycol monoethyl ether, 1,1'-oxybis(2-propanol), triethylene glycol monomethyl ether, triglyme and/or diglyme.

As used herein, it is understood that "oilfield application fluid" means any fluid utilized in the processing, extraction or treatment of oil, which in one embodiment includes fluids utilized in and around an oil producing well. Some oilfield application fluids include but are not limited to: well treatment fluids, stimulation fluids, slickwater fluids, drilling fluids, acidizing fluids, workover fluids, completion fluids, packer fluids, subterranean formation treating fluids, mud-reversal fluids, deposit removal fluids (e.g., asphaltene, wax, oil), wellbore cleaning fluids, cutting fluids, carrier fluids, carrier fluids (for mutual solvency), degreasing fluids, fracturing fluids, spacer fluids, hole abandonment fluids, among others.

Workover fluids generally are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc. Fracturing fluids are used in oil recovery operations where subterranean is treated to create pathways for the formation fluids to be recovered.

Described herein are systems and methods for replacing glycol based mutual solvents in industrial applications, namely oil field applications. Also described herein are alternative solvents and solvent blends which is can replace glycol-based mutual solvents such as EGMBE. Also described herein are oil field formulations with improved toxicity profile or otherwise, environmental profile, which can be utilized in oil field applications.

In one embodiment, the method for replacing glycol-based mutual solvents in an oil field application includes obtaining an alternative solvent blend, then substituting all or a portion a glycol-based mutual solvent in equal parts with the alternative solvent blend. Typically, the glycol-based mutual solvent forms part of a oil field formulation. The oil field formulation, in turn, is typically utilized in an oil field application such as fracturing, acidizing, workover, etc. Thus, the alternative solvent blend, once incorporated as part of the formulation, imparts an improved environmental profile, including ecotox profiles, with respect to the formulation and application. In other embodiments, the glycol-based mutual solvent forms part of a industrial formulation. Industrial formulations can include (but are not limited to) weatherizing formulations, which prevent freezing of a fluid, or maintain the viscosity of a fluid below a certain level.

In one embodiment, the alternative solvent is chosen from one of the following components (a through h), below. In another embodiment, the alternative solvent is an alternative solvent blend chosen from at least one component (a through h), below, typically, two or more components.

a) dialkyl methylglutarate;
b) a first blend of: dialkyl methylglutarate, dialkyl ethylsuccinate and dialkyl adipate;
c) a second blend of: dialkyl adipate, dialkyl glutarate and dialkyl succinate;
d) a dioxolane compound of formula I:

(I)

wherein $R_6$ and $R_7$, which may be identical or different, is individually a hydrogen, an alkyl group, an alkenyl group, a phenyl group, wherein n is an integer of from 1 to 10;

e) a compound or mixture of compounds having formula (II):

$$R_3OOC\text{-}A\text{-}CONR_4R_5 \qquad (II),$$

wherein $R_3$ is a group chosen from saturated or unsaturated, linear or branched, optionally cyclic, optionally aromatic hydrocarbon-based groups comprising an average number of carbon atoms ranging from 1 to 36; wherein $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36, it being possible for $R_4$ and $R_5$ to optionally together form a ring, that is optionally substituted and/or that optionally comprises a heteroatom; and wherein A is a linear or branched divalent alkyl group comprising an average number of carbon atoms ranging from 2 to 12, typically from 2 to 4;

f) an alkyldimethylamine;
g) a $C_1$-$C_4$ alcohol; and
h) any combination thereof.

In one embodiment, the a $C_1$-$C_4$ alcohol is chosen from t-butyl alcohol, butyl alcohol, iso-propyl alcohol, or propyl alcohol. In one typical embodiment, the $C_1$-$C_4$ alcohol is iso-propyl alcohol.

In one embodiment, the alternative solvent comprises (i) one or a (ii) blend of dibasic esters. In one embodiment, the blend comprises adducts of alcohol and linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_3$ alkyl, and A comprises a mixture of —$(CH_2)_4$—, —$(CH_2)_3$, and —$(CH_2)_2$—. In another embodiment, $R_1$ and/or $R_2$ comprise, individually, a $C_4$-$C_{12}$ alkyl, more typically a $C_4$-$C_5$ alkyl. In one embodiment, $R_1$ and $R_2$ can individually comprise a hydrocarbon group originating from fusel oil. In one embodiment, $R_1$ and $R_2$ individually can comprise a hydrocarbon group having 1 to 8 carbon atoms. In one embodiment, $R_1$ and $R_2$ individually can comprise a hydrocarbon group having 5 to 8 carbon atoms. In another embodiment, A comprises a least one, typically at least two, of: —$(CH_2)_4$—, —$CH_2CH_2CH(CH_3)$—, —$CH_2CH(C_2H_5)$—, —$(CH_2)_4$—, —$CH_2CH_2CH(CH_3)$—, or —$CH_2CH(C_2H_5)$—.

In one embodiment, the blend comprises adducts of alcohol and branched or linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_8$ alkyl, and A comprises a mixture of —$(CH_2)_4$—, —$CH_2CH_2CH(CH_3)$—, and —$CH_2CH(C_2H_5)$—. In another embodiment, $R_1$ and/or $R_2$ comprise, individually, a $C_4$-$C_{12}$ alkyl, more typically a $C_4$-$C_5$ alkyl. It is understood that the acid portion may be derived from such dibasic acids such as adipic, succinic, glutaric, oxalic, malonic, pimelic, suberic and azelaic acids, as well as mixtures thereof.

The dibasic esters of the present invention can be obtained by a process comprising an "esterification" stage by reaction of a diacid of formula HOOC-A-COOH or of a diester of formula MeOOC-A-COOMe with a branched alcohol or a mixture of alcohols. The reactions can be appropriately catalyzed. Use is preferably made of at least 2 molar equivalents of alcohols per diacid or diester. The reactions can, if appropriate, be promoted by extraction of the reaction by-products and followed by stages of filtration and/or of purification, for example by distillation.

The diacids in the form of mixtures can in particular be obtained from a mixture of dinitrile compounds in particular produced and recovered in the process for the manufacture of adiponitrile by double hydrocyanation of butadiene. This process, used on a large scale industrially to produce the greater majority of the adiponitrile consumed worldwide, is described in numerous patents and works. The reaction for the hydrocyanation of butadiene results predominantly in the formulation of linear dinitriles but also in formation of branched dinitriles, the two main ones of which are methylglutaronitrile and ethylsuccinonitrile. The branched dinitrile compounds are separated by distillation and recovered, for example, as top fraction in a distillation column, in the stages for separation and purification of the adiponitrile. The branched dinitriles can subsequently be converted to diacids or diesters (either to light diesters, for a subsequent transesterification reaction with the alcohol or the mixture of alcohols or the fusel oil, or directly to diesters in accordance with the invention).

Dibasic esters of the present invention may be derived from one or more by-products in the production of polyamide, for example, polyamide 6,6. In one embodiment, the cleaning composition comprises a blend of linear or branched, cyclic or noncyclic, $C_1$-$C_{20}$ alkyl, aryl, alkylaryl or arylalkyl esters of adipic diacids, glutaric diacids, and succinic diacids. In another embodiment, the cleaning composition comprises a blend of linear or branched, cyclic or noncyclic, $C_1$-$C_{20}$ alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of dibasic esters can be derived from one or more by-products in the reaction, synthesis and/or production of adipic acid utilized in the production of polyamide, the cleaning composition comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The cleaning composition comprises a blend of dialkyl esters of adipic diacids, methylglutaric diacids, and ethylsuccinic diacids (herein referred to sometimes as "MGA", "MGN", "MGN blend" or "MGA blend").

In certain embodiments, the dibasic ester blend comprises:

a diester of formula I:

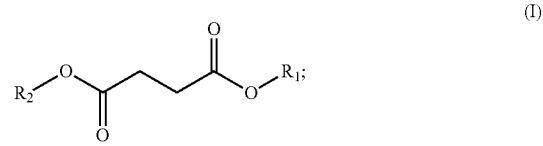

a diester of formula II:

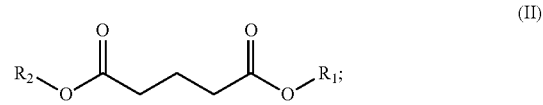

and
a diester of formula III:

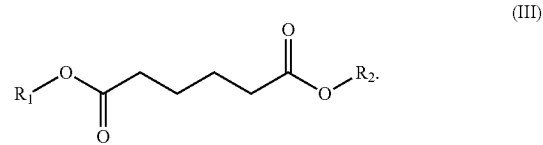

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C. Mention may also be made of Rhodiasolv® RPDE (Rhodia Inc., Cranbury, N.J.), Rhodiasolv® DIB (Rhodia Inc., Cranbury, N.J.) and Rhodiasolv® DEE (Rhodia Inc., Cranbury, N.J.).

In certain other embodiments, the dibasic ester blend comprises:

a diester of the formula IV:

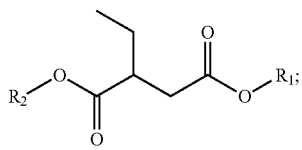

(IV)

a diester of the formula V:

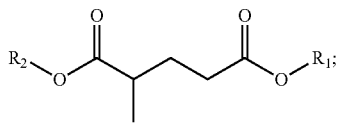

(V)

and, optionally, a diester of the formula VI:

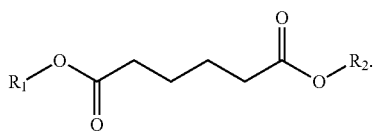

(VI)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI. More typically, the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of 98° C., a vapor pressure at 20° C. of less than about 10 Pa, and a distillation temperature range of about 200-275° C. Mention may be made of Rhodiasolv® IRIS and Rhodiasolv® DEE/M, manufactured by Rhodia Inc. (manufactured by Rhodia Inc., Cranbury, N.J.)

In another embodiment, the alternative solvent or alternative solvent blend can include other solvents, including but not limited to aliphatic or acyclic hydrocarbons solvents, halogenated solvents, aromatic hydrocarbon solvents, cyclic terpenes, unsaturated hydrocarbon solvents, halocarbon solvents, polyols, alcohols including short chain alcohols, ketones or mixtures thereof.

The dioxane compound utilized as the alternative solvent or in the alternative solvent blend as described herein includes those of formula (I), below:

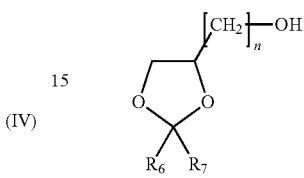

in which: $R_6$ and $R_7$, which are identical or different, represent hydrogen or a $C_1$-$C_{14}$ group or radical. In one embodiment, $R_6$ and $R_7$ are individually selected from an alkyl group, alkenyl group or phenyl radical. In some embodiments, "n" is an integer of 1, 2, 3, 4, 5, 6, 7, 8, 9, 10, 11 or 12. Typically, "n" is an integer from about 1 to 4. More typically, "n" is 1 or 2. Mention may be made of Augeo® (Rhodia Inc., Cranbury, N.J.).

In one particular embodiment, $R_6$ and $R_7$ are radicals individually selected from methyl, ethyl, n-propyl, isopropyl or isobutyl radical.

In one embodiment the dioxolane compound is of formula (I) is 2,2-dimethyl-1,3-dioxolane-4-methanol. In another embodiment, the dioxolane compound of formula (I) is 2,2-diisobutyl-1,3-dioxolane-4-methanol (also known by the acronym IIPG, for the synonym 1-isobutyl-isopropylidene glycerol).

In one embodiment, a compound utilized as the alternative solvent or as a component in the alternative solvent blend is a compound of general formula (II):

$$R_3OOC\text{-}A\text{-}CONR_4R_5 \qquad (II),$$

According to one embodiment, the expression "compound" denotes any compound corresponding to the general formula (II). In other embodiments, the term "compound" also refers to mixtures of several molecules corresponding to general formula (II). It may therefore be a molecule of formula (II) or a mixture of several molecules of formula (II), wherein both fall under the definition of the term "compound" when referring to formula (II).

The $R_3$, $R_4$ and $R_5$ groups can be, in some embodiments, identical or, in other embodiment, different. In one embodiment, may be groups chosen from $C_1$-$C_{20}$ alkyl, aryl, alkaryl or arylalkyl groups or the phenyl group. In another embodiment, may be groups chosen from $C_1$-$C_{12}$ alkyl, aryl, alkaryl or arylalkyl groups or the phenyl group. Mention is made especially of Rhodiasolv® PolarClean (Manufactured by Rhodia Inc. of Cranbury, N.J.). The $R_4$ and $R_5$ groups may optionally be substituted. In one particular embodiment, the groups are substituted with hydroxyl groups.

In one embodiment, $R_3$ group is chosen from methyl, ethyl, propyl, isopropyl, n-butyl, isobutyl, n-pentyl, isopentyl, isoamyl, n-hexyl, cyclohexyl, 2-ethylbutyl, n-octyl, isooctyl, 2-ethylhexyl, tridecyl groups.

$R_4$ and $R_5$ groups, which are identical or different, in one embodiment, may especially be chosen from methyl, ethyl, propyl (n-propyl), isopropyl, n-butyl, isobutyl, n-pentyl, amyl, isoamyl, hexyl, cyclohexyl or hydroxyethyl groups. The $R_4$ and $R_5$ groups may also be such that they form, together with the nitrogen atom, a morpholine, piperazine or piperidine group. According to some embodiments, $R_4$ and $R_5$ are each methyl, or $R_4$ and $R_5$ are each ethyl, or $R_4$ and $R_5$ are each hydroxyethyl.

According to one embodiment, if A comprises a linear group of formula —$CH_2$—$CH_2$— and/or of formula —$CH_2$—$CH_2$—$CH_2$—$CH_2$— and/or of formula —$(CH_2)_8$— then it is a mixture of A groups. According to one particular embodiment, if A is linear, then it is a mixture of A groups, for example a mixture of two or three —$CH_2$—$CH_2$— (ethylene); —$CH_2$—$CH_2$—$CH_2$— (n-propylene); and —$CH_2$—$CH_2$—$CH_2$—$CH_2$— (n-butylene) groups (or isomers thereof).

According to a first particular embodiment of the invention, the A group is a divalent linear alkyl group chosen from the groups of the following formulae: —$CH_2$—$CH_2$— (ethylene); —$CH_2$—$CH_2$—$CH_2$— (n-propylene); —$CH_2$—$CH_2$—$CH_2$—$CH_2$— (n-butylene), and mixtures thereof.

According to such embodiment, the compound is a mixture according to the following mixture of molecules:

$R_3OOC$—$(CH_2)_2$—$CONR_4R_5$;

$R_3OOC$—$(CH_2)_3$—$CONR_4R_5$; and $R_3OOC$—$(CH_2)_4$—$CONR_4R_5$

According to another particular embodiment of the invention, the A group is a divalent branched alkyl group chosen from the groups of the following formulae: —$CH(CH_3)$—$CH_2$—$CH_2$—; —$CH(C_2H_5)$—$CH_2$—; and, optionally, —$CH_2$—$CH_2$—$CH_2$—$CH_2$—; as well as mixtures thereof.

According to such embodiment, the compound is a mixture according to the following mixture of molecules:

$R_3OOC$—$CH(CH_3)(CH_2)_2$—$CONR_4R_5$;

$R_3OOC$—$CH(C_2H_5)CH_2$—$CONR_4R_5$; and, optionally, $R_3OOC$—$(CH_2)_4$—$CONR_4R_5$ According to one particular variant in this first embodiment, the compound of the invention is chosen from the following compounds:

MeOOC—$CH_2$—$CH_2$—$CONMe_2$;

MeOOC—$CH_2$—$CH_2$—$CH_2$—$CONMe_2$;

MeOOC—$CH_2$—$CH_2$—$CH_2$—$CONMe_2$, as a mixture with MeOOC—$CH_2$—$CH_2$—$CH_2$—$CH_2$—$CONMe_2$ and/or with MeOOC—$CH_2$—$CH_2$—$CONMe_2$.

According to another embodiment of the invention, the A group is a divalent branched alkylene group having one of the following formulae (IIa), (IIb), (IIc), (IIIa) and (IIIb), or a mixture of at least two groups chosen from the groups of formulae (IIa), (IIb) and (IIc) or from the groups of formulae (IIIa) and (IIIb), or a mixture of at least two groups, one chosen from the groups of formulae (IIa), (IIb) and (IIc) and the others chosen from the groups of formulae (IIIa) and (IIIb):

—$(CHR_9)_y$—$(CHR_8)_x$—$(CHR_9)_z$—$CH_2$—$CH_2$— (IIa)

—$CH_2$—$CH_2$—$(CHR_9)_z$—$(CHR_6)_x$—$(CHR_9)_y$— (IIb)

—$(CHR_9)_z$—$CH_2$—$(CHR_8)_x$—$CH_2$—$(CHR_9)_y$— (IIc)

—$(CHR_9)_y$—$(CHR_8)_x$—$(CHR_9)_z$—$CH_2$— (IIIa)

—$CH_2$—$(CHR_9)_z$—$(CHR_8)_x$—$(CHR_9)_y$— (IIIb)

where:
x is an integer greater than 0;
y is an average integer greater than or equal to 0;
z is an average integer greater than or equal to 0; $R_8$, which is identical or different, is a $C_1$-$C_6$, preferably $C_1$-$C_4$, alkyl group; and $R_9$, which is identical or different, is a hydrogen atom or a $C_1$-$C_6$, preferably $C_1$-$C_4$, alkyl group. In this particular embodiment, the A group is preferably a group such that y and z are 0.

In one embodiment, in formula (IIa) and/or in the formula (IIb): x is 1; y and z are 0; $R_8$ is methyl.

In another embodiment, in the formula (IIIa) and/or in the formula (IIIb): x is 1; y and z are 0; $R_8$ is ethyl.

According to another embodiment, the compound of the invention is chosen from the following compounds, and mixtures thereof:

MeOOC-$A_{MG}$-$CONMe_2$;

MeOOC-$A_{ES}$-$CONMe_2$;

PeOOC-$A_{MG}$-$CONMe_2$;

PeOOC-$A_{ES}$-$CONMe_2$;

CycloOOC-$A_{MG}$-$CONMe_2$;

CycloOOC-$A_{ES}$-$CONMe_2$;

EhOOC-$A_{MG}$-$CONMe_2$;

EhOOC-$A_{ES}$-$CONMe_2$;

PeOOC-$A_{MG}$-$CONEt_2$;

PeOOC-$A_{ES}$-$CONEt_2$;

CycloOOC-$A_{MG}$-$CONEt_2$;

CycloOOC-$A_{ES}$-$CONEt_2$;

BuOOC-$A_{MG}$-$CONEt_2$;

BuOOC-$A_{ES}$-$CONEt_2$;

BuOOC-$A_{MG}$-$CONMe_2$;

BuOOC-$A_{ES}$-$CONMe_2$;

EtBuOOC-$A_{MG}$-$CONMe_2$;

EtBuOOC-$A_{ES}$-$CONMe_2$;

$n$-HeOOC-$A_{MG}$-$CONMe_2$;

$n$-HeOOC-$A_{ES}$-$CONMe_2$;

where
$A_{MG}$ represents an $MG_a$ group of formula —$CH(CH_3)$—$CH_2$—$CH_2$—, or $MG_b$ group of formula —$CH_2$—$CH_2$—$CH(CH_3)$— or a mixture of $MG_a$ and $MG_b$ groups;
$A_{ES}$ represents an $ES_a$ group of formula —$CH(C_2H_5)$—$CH_2$—, or $ES_b$ group of formula —$CH_2$—$CH(C_2H_5)$— or a mixture of $ES_a$ and $ES_b$ groups;
Pe represents a pentyl group, preferably an isopentyl or isoamyl group;
Cyclo represents a cyclohexyl group;
Eh represents a 2-ethylhexyl group;

Bu represents a butyl group, preferably an n-butyl or tert-butyl group;

EtBu represents an ethylbutyl group; and n-He represents an n-hexyl group.

It is mentioned that according to one particular embodiment, the compound of the invention is a compound different from the following compounds:

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$; and

MeOOC—CH$_2$—CH$_2$—CONMe$_2$;

if the latter are not used as a mixture with other compounds corresponding to formula (II).

It is mentioned that according to one even more particular variant of one or the other of the particular embodiments of the invention, the compound of the invention is a novel compound of the invention, different from the following compounds or mixtures, if the latter, individually, are not used as a mixture with other compounds corresponding to formula (II):

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOC—CH(CH$_3$)—CH$_2$—CONEt$_2$;

Cyclohexyl-OOC—CH(CH$_3$)—CH$_2$—CONEt$_2$;

Ph-CH$_2$OOC—CH(CH$_3$)—CH$_2$—CONEt$_2$;

p-cresyl-OOC—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$; and MeOOC—CH$_2$—CH(CH$_3$)—CH$_2$—CONH(n-butyl).

It is mentioned that according to one even more particular variant of one or the other of the particular embodiments of the invention, the compound of the invention is a novel compound of the invention, different from the following compounds or mixtures, if the latter, individually, are not used as a mixture with other compounds corresponding to formula (II):

C$_4$H$_9$—OOC—CH$_2$—CH$_2$—CONEt$_2$

C$_6$—H$_{13}$—OOC—(CH$_2$)$_8$—CON(C$_3$—H$_7$)$_2$

C$_8$H$_{17}$—OOC—(CH$_2$)$_3$—CON(C$_4$H$_9$)$_2$

C$_8$H$_{17}$—OOC—(CH$_2$)$_8$—CON(C$_8$H$_{17}$)$_2$.

In one embodiment, it is possible to use the following compounds as a mixture with other compounds corresponding to formula (II):

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOC—CH(CH$_3$)—CH$_2$—CONEt$_2$;

Cyclohexyl-OOC—CH(CH$_3$)—CH$_2$—CONEt$_2$;

Ph-CH$_2$—OOC—CH(CH$_3$)—CH$_2$—CONEt$_2$;

p-cresyl-OOC—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$;

MeOOC—CH$_2$—CH(CH$_3$)—CH$_2$—CONH(n-butyl);

C$_4$H$_9$—OOC—CH$_2$—CH$_2$—CONEt$_2$;

C$_6$—H$_{13}$—OOC—(CH$_2$)$_8$—CON(C$_3$H$_7$)$_2$;

C$_8$H$_{17}$—OOC—(CH$_2$)$_8$—CON(C$_4$H$_9$)$_2$; and

C$_8$—H$_{17}$—OCC—(CH$_2$)$_8$—CON(C$_8$H$_{17}$)$_2$.

It is mentioned that according to one still more particular variant of one or the other of the particular embodiments of the invention, the following compounds or mixtures are not used:

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOC—CH(CH$_3$)—CH$_2$—CONEt$_2$;

Cyclohexyl-OOC—CH(CH$_3$)—CH$_2$—CONEt$_2$;

Ph-CH$_2$OOC—CH(CH$_3$)—CH$_2$—CONEt$_2$;

p-cresyl-OOC—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$; and MeOOC—CH$_2$—CH(CH$_3$)—CH$_2$—CONH(n-butyl).

It is mentioned that according to one still more particular variant of one or the other of the particular embodiments of the invention, the following compounds or mixtures are not used:

$C_4H_9$—OOC—$CH_2$—$CH_2$—$CONEt_2$;

$C_6H_{13}$—OOC—$(CH_2)_8$—$CON(C_3H_7)_2$;

$C_8$—$H_{17}$—OOC—$(CH_2)_8$—$CON(C_4$—$H_9)_2$;

$C_8H_{17}$—OOC—$(CH_2)_8$—$CON(C_8H_{17})_2$.

According to one embodiment, the esteramide has a melting point that is less than or equal to 20° C., preferably 5° C., preferably 0° C.

In one particular embodiment, $R_3$ is a group chosen from saturated or unsaturated, linear or branched, optionally cyclic, optionally aromatic hydrocarbon-based groups comprising an average number of carbon atoms ranging from 1 to 36. $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36. It is possible for $R_4$ and $R_5$ to form a ring together, and in some embodiment, the ring is optionally substituted and/or optionally comprises a heteroatom. In some embodiments, A is a linear or branched divalent alkyl group comprising an average number of carbon atoms ranging from 1 to 20, in some embodiments, from 2 to 12, in other embodiments, from 2 to 8, in yet other embodiments, from 2 to 4.

In one embodiment, the alternative solvent comprises amides, alkyl amides, or dialkyl amides. In an alternative embodiment, one component in the alternative solvent blend comprises an amide, alkyl amide, and/or dialkyl amide. In one particular embodiment, the alternative solvent or alternative solvent blend is alkyldimethylamide (ADMA). The alkyl group is a $C_1$-$C_{50}$ alkyl group, more typically a $C_2$-$C_{30}$ alkyl group, even more typically, a $C_2$-$C_{20}$ alkyl group. In one particular embodiment, the alkyldimethylamide is N,N-dimethyldecanamide (miscibility 0.034%) or N,N-dimethyloctanamide (miscibility 0.43%), or mixtures thereof. Mention is made especially of the compounds sold by Rhodia, Rhodiasolv® ADMA810 and Rhodiasolv® ADMA10.

In some embodiments, the oil field formulation contains suitable components apart from the alternative solvent or alternative solvent blend. Such (non-limiting) additional components can include at least one surfactant, proppants, co-solvents, buffering and/or pH control agents, fragrances, opacifying agents, anti-corrosion agents, whiteners, defoamers, dyes, sudsing control agents, foaming agents, stabilizers, chelating agents, biocides, thickeners and the like.

The surfactant can be any number of cationic, amphoteric, zwitterionic, anionic or nonionic surfactants, derivatives thereof, as well as blends of such surfactants.

In one embodiment, the nonionic surfactants generally includes one or more of for example amides such as alkanolamides, ethoxylated alkanolamides, ethylene bisamides; esters such as fatty acid esters, glycerol esters, ethoxylated fatty acid esters, sorbitan esters, ethoxylated sorbitan; ethoxylates such as alkylphenol ethoxylates, alcohol ethoxylates, tristyrylphenol ethoxylates, mercaptan ethoxylates; end-capped and EO/PO block copolymers such as ethylene oxide/propylene oxide block copolymers, chlorine capped ethoxylates, tetra-functional block copolymers; amine oxides such lauramine oxide, cocamine oxide, stearamine oxide, stearamidopropylamine oxide, palmitamidopropylamine oxide, decylamine oxide; fatty alcohols such as decyl alcohol, lauryl alcohol, tridecyl alcohol, myristyl alcohol, cetyl alcohol, stearyl alcohol, oleyl alcohol, linoleyl alcohol and linolenyl alcohol; and alkoxylated alcohols such as ethoxylated lauryl alcohol, trideceth alcohols; and fatty acids such as lauric acid, oleic acid, stearic acid, myristic acid, cetearic acid, isostearic acid, linoleic acid, linolenic acid, ricinoleic acid, elaidic acid, arichidonic acid, myristoleic acid and mixtures thereof.

In another embodiment, the non-ionic surfactant is a glycol such as polyethylene glycol (PEG), alkyl PEG esters, polypropylene glycol (PPG) and derivatives thereof. In one embodiment, the surfactant is an alcohol ethoxylate, an alkyl phenol ethoxylate or a terpene alkoxylate. In one exemplary embodiment, the surfactant is a $C_6$-$C_{13}$ alcohol ethoxylate and, more typically, a $C_8$-$C_{12}$ alcohol ethoxylate.

In another embodiment, the surfactant is a cationic surfactant. The cationic surfactant includes but is not limited to quaternary ammonium compounds, such as cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or Quaternium-13), stearyl dimethyl distearyldimonium chloride, dicetyl dimonium chloride, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, dicetyl dimonium chloride and distearyldimonium chloride; isostearylaminopropalkonium chloride or olealkonium chloride; behentrimonium chloride; as well as mixtures thereof.

In another embodiment, the surfactant is an anionic surfactant. The anionic surfactant includes but is not limited to linear alkylbenzene sulfonates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, monoalkyl phosphates, dialkyl phosphates, sarcosinates, sulfosuccinates, isethionates, and taurates, as well as mixtures thereof. Commonly used anionic surfactants that are suitable as the anionic surfactant component of the composition of the present invention include, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium-monoalkyl phosphates, sodium dialkyl phosphates, sodium lauroyl sarcosinate, lauroyl sarcosine, cocoyl sarcosine, ammonium cocyl sulfate, ammonium lauryl sulfate, sodium cocyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cocyl sulfate, potassium lauryl sulfate, monoethanolamine cocyl sulfate, sodium tridecyl benzene sulfonate, and sodium dodecyl benzene sulfonate. Branched anionic surfactants are particularly preferred, such as sodium trideceth sulfate, sodium tridecyl sulfate, ammonium trideceth sulfate, ammonium tridecyl sulfate, and sodium trideceth carboxylate.

Any amphoteric surfactant that is acceptable for use includes but is not limited to derivatives of aliphatic secondary and tertiary amines in which the aliphatic radical can be straight chain or branched and wherein one of the aliphatic substituents contains from about 8 to about 18 carbon atoms and one contains an anionic water solubilizing group. Specific examples of suitable amphoteric surfactants include the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates, such as for example, cocoamphoacetate cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

Suitable zwitterionic surfactants include alkyl betaines, such as cocodimethyl carboxymethyl betaine, lauryl dimethyl carboxymethyl betaine, lauryl dimethyl alpha-carboxy-ethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxypropyl)alpha-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl) sulfopropyl betaine, and alkylamidopropylhydroxy sultaines.

EXPERIMENTS

Described herein are several solvents that are less toxic than typical alkane and glycol ethers like EGMBE. Referring to FIG. 1, utilizing a Hansen Parameter map, EGMBE and other glycols are compared with an alternative solvent, or alternative solvent blend, as described herein. Such solvent or solvent blends could be made to approach the solvency of EGMBE or other targeted glycol, glycol ethers.

Surface Tension: Referring generally to Table 2, interfacial tension is measured for each test solvent or solvent blend for EGMBE-replacement. No further dilution is performed on the solvent prior to measurement. Interfacial tension was measured using about 50 milliliters sample by the ring method (Du Nouy method).

Miscibility Test: Referring generally to Tables 4-6, the test solvent or solvent blend for EGMBE-replacement is mixed with common solvents used in oilfield industries to determine miscibility. For each test solvent, it is blended with a common solvent at 50/50 volume per volume ratio. It is shaken vigorously for about a minute and let stand for about 5 mins. A complete miscibility is recorded if there is no formation of layers. Formation of turbid mixture or multiple layers is recorded as immiscible or separate.

Experiment 1: Comparing EGMBE's Wettability, Surface Tension and Solvency

TABLE 1

Comparing EGMBE's wettability with alternative solvents/blends

| Chemical Description | Mean (°) |
|---|---|
| Water | 109.2 |
| EGMBE | 45.0 |

TABLE 1-continued

Comparing EGMBE's wettability with alternative solvents/blends

| Chemical Description | Mean (°) |
|---|---|
| Propylene Carbitol | 72.0 |
| Butyl Carbitol | 50.8 |
| Polarclean | 48.9 |
| Isopropyl Alcohol (IPA) | — |
| Rhodiasolv IRIS | 47.2 |
| Augeo SL 191 | 50.5 |
| Dowanol | 29.8 |
| 90% IRIS:10% Augeo | 42.5 |
| 75% IRIS:25% Augeo | 40.0 |
| 45% IPA:28% Iris:27% Augeo | 42.8 |
| 45% IPA:28% Iris:27% PC | 40.9 |
| 35% Iris:35% Augeo:30% PC | 44.2 |
| 90% IRIS:10% Polarclean | 46.7 |
| 75% IRIS:25% Polarclean | 45.4 |
| 50% IRIS:50% IPA | 41.3 |
| 45% IPA:55% Augeo | 41.8 |
| 52% IPA:48% PC | 41.3 |
| 50% IRIS:50% PC | 53.6 |
| 45% IPA:28% Iris:27% Augeo | 42.4 |
| 45% IPA:28% Iris:27% PC | 47.2 |
| 35% Iris:35% Augeo:30% PC | 53.1 |

TABLE 2

Comparing EGMBE's surface tension with alternative solvents/blends

| | ST (mN/m) |
|---|---|
| EGMBE | 26.3757 |
| Rhodiasolv IRIS | 33.2946 |
| Augeo | 31.9988 |
| Polarclean | 33.871 |
| 90% IRIS:10% IPA | 30.02 |
| 75% IRIS:25% IPA | 26.41 |
| 50% IRIS:50% IPA | 23.71 |
| 55% Augeo:45% IPA | 24.78 |
| 48% PC:52% IPA | 24.68 |
| 90% IRIS:10% Polarclean | 33.17 |
| 75% IRIS:25% Polarclean | 33.77 |
| 50% IRIS:50% Polarclean | 34.97 |
| 45% IPA:28% Iris:27% PC | 24.89 |
| 45% IPA:28% Iris:27% Augeo | 24.67 |
| 35% Iris:35% Augeo:30% PC | 33.51 |

TABLE 3

Comparing EGMBE's solubility with alternative solvents/blends. In the tables that follow, S = separate, M = miscible.

| Solubility in | EGMBE | Dowanol PnB | IPA | POLAR CLEAN | AUGEO SL191 | IRIS |
|---|---|---|---|---|---|---|
| Crude oil | M | M | M | S | S | S |
| Exxsol D100 | M | M | M | S | S | S |
| Alpha Olefin C1618 | M | M | M | S | S | S |
| Dodecane (to mimic Kerosen) | M | M | M | S | S | S |
| isoparrafin | M | M | M | S | S | M |
| xylene | M | M | M | M | M | M |
| toluene | M | M | M | M | M | M |
| Solvesso 150 ND | M | M | M | M | M | M |
| D-Limonene | M | M | M | M | M | M |
| isopropanol | M | M | M | M | M | M |
| Water | M | S | M | M | M | S |
| Brines (Forties FW) | S | S | M | M | M | S |

TABLE 4

Comparing EGMBE's solubility with alternative solvent blends

| Solubility in | 55% AUGEO, 45% IPA | 80% AUGEO, 20% IPA 75/25 volume | 90% Augeo, 10% IPA (87/13 volume) | 90% IRIS, 10% Polarclean | 75% IRIS, 25% Polarclean | 50% IRIS, 50% Polarclean |
|---|---|---|---|---|---|---|
| Crude oil | | | | | | |
| Exxsol D100 | | | S | S | S | S |
| Alpha Olefin C1618 | | | S | S | S | S |
| Dodecane (to mimic Kerosen) | | | S | S | S | S |
| Isopar L | M | M | S | S | S | S |
| xylene | M | M | M | M | M | M |
| toluene | M | M | M | M | M | M |
| Solvesso 150 ND | M | M | M | M | M | M |
| D-Limonene | M | M | M | M | M | M |
| isopropanol | M | M | M | M | M | M |
| Water | M | M | M | S | S | S |
| Brines (Forties FW) | | | | | | |

TABLE 5

Comparing EGMBE's solubility with alternative solvent blends.

| Solubility in | IRIS/AUGE0 50/50 | IRIS/IPA 90/10 | IRIS/IPA 75/25 | IRIS/IPA 50/50 | IRIS/ Carbitol 80/20 | AUGEO/ Carbitol 80/20 | 45% IPA 28% IRIS 27% Augeo | 35% Iris 35% Augeo 30% PC |
|---|---|---|---|---|---|---|---|---|
| Crude oil | | | | | | | | |
| Exxsol D100 | S | | | | | | | S |
| Alpha Olefin C1618 | S | | | | | | | S |
| Dodecane (to mimic Kerosen) | S | | | | | | | S |
| isoparrafin | S | M | M | M | S | S | M | S |
| xylene | M | M | M | M | | | M | |
| toluene | M | M | M | M | | | M | |
| Solvesso 150 ND | M | M | M | M | | | M | |

TABLE 5-continued

Comparing EGMBE's solubility with alternative solvent blends.

| Solubility in | IRIS/AUGEO 50/50 | IRIS/IPA 90/10 | IRIS/IPA 75/25 | IRIS/IPA 50/50 | IRIS/ Carbitol 80/20 | AUGEO/ Carbitol 80/20 | 45% IPA 28% IRIS 27% Augeo | 35% Iris 35% Augeo 30% PC |
|---|---|---|---|---|---|---|---|---|
| D-Limonene | M | M | M | M | | | M | |
| isopropanol | M | M | M | M | | | M | |
| Water | S | S | S | S | S | M | M | S |
| Brines (Forties FW) | | | | | | | | |

TABLE 6

Blends Miscible in water and in Mud solvents (50/50 wt - room temperature).

| Miscibility in | Butoxyethanol EGMBE | Blend 1 (dioxolane 1 + dioxolane 2) 55/45 wt | Blend 2 (dioxolane + Dowanol PnB) 76/24 wt | Blend 3 (dioxolane + alkyldimethylamine) 70/30 wt |
|---|---|---|---|---|
| Crude oil | ++++++ instantaneous miscible | ++++++ instantaneous miscible | ++++++ instantaneous miscible | ++++++ instantaneous miscible |
| Exxsol D100 | miscible | miscible | miscible | miscible |
| Alpha Olefin C1618 | miscible | miscible | miscible | miscible |
| Isopar L | miscible | miscible | miscible | miscible |
| xylene | miscible | miscible | miscible | miscible |
| D-Limonene | miscible | miscible | miscible | miscible |
| Water | miscible | miscible | miscible | miscible |
| Safety Risks | H302 H312 H332 H315 H319 | H319 | H315 H319 | H302 H312 H318 H319 |

As illustrated in Table 6, the two solvent blends (Blend 1 and Blend 2) show similar solvent properties to Butoxyethanol with a friendly ESH (environment, health and safety) profile.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation in scope is to be inferred.

What is claimed is:

1. An oilfield composition comprising a first dioxolane compound of formula I:

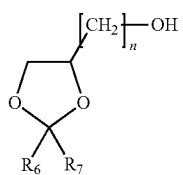

(I)

wherein $R_6$ and $R_7$, which may be identical or different, is individually a hydrogen, an alkyl group, an alkenyl group, a phenyl group, wherein n is an integer of from 1 to 10; at least one component selected from the group consisting of:

a) dialkyl methylglutarate;

b) a first blend of: dialkyl methylglutarate, dialkyl ethylsuccinate and, optionally, dialkyl adipate; and c) a second blend of dialkyl adipate, dialkyl glutarate and dialkyl succinate;

and at least one proppant.

2. The composition of claim 1, further comprising at least one component selected from the group consisting of:

a) a compound or mixture of compounds having formula (II):

$$R_3OOC\text{-}A\text{-}CONR_4R_5 \quad (II),$$

wherein $R_3$ is a group chosen from saturated or unsaturated, linear or branched, optionally cyclic, optionally aromatic hydrocarbon-based groups comprising an average number of carbon atoms ranging from 1 to 36;

wherein $R_4$ and $R_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36; and wherein A is a linear or branched divalent alkyl group comprising an average number of carbon atoms ranging from 2 to 12;

b) an alkyldimethylamide;
c) a $C_1$-$C_4$ alcohol; and
d) a second dioxolane compound of formula I:

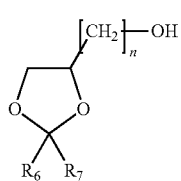

(I)

wherein $R_6$ and $R_7$, which may be identical or different, is individually a hydrogen, an alkyl group, an alkenyl group, a phenyl group, wherein n is an integer of from 1 to 10, and wherein the second dioxolane compound is different from the first dioxolane compound.

3. The composition of claim 2 comprising said alkyldimethylamide and said $C_1$-$C_4$ alcohol.

4. The composition of claim 3 wherein the alkyldimethylamide is N,N-Dimethyldecanamide and wherein the $C_1$-$C_4$ alcohol is isopropyl alcohol.

* * * * *